April 7, 1964 R. GUILLAUME ETAL 3,127,873
TETHERING DEVICES FOR STABLED ANIMALS
Filed March 14, 1962 3 Sheets-Sheet 1
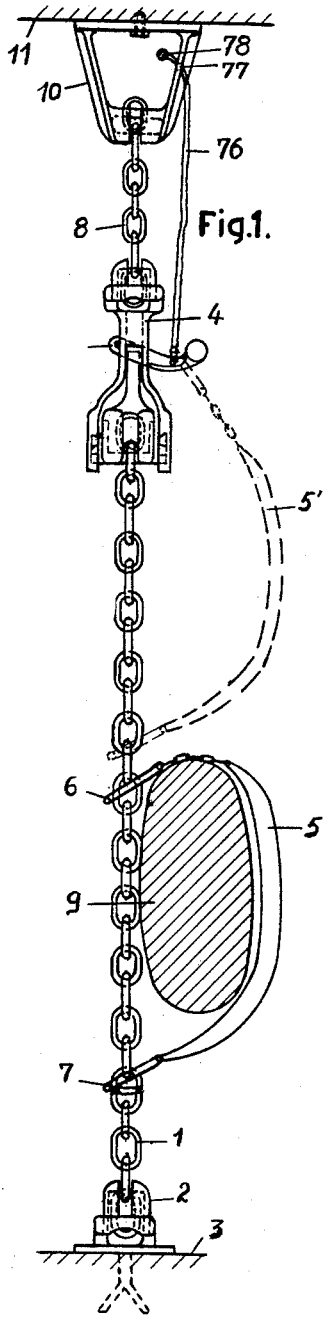
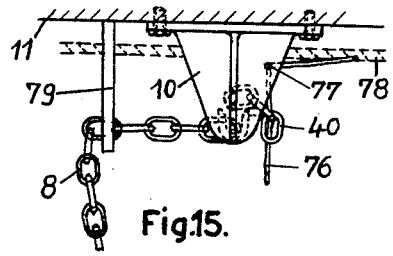
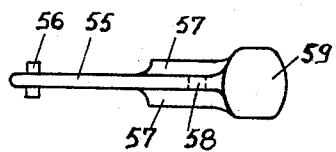
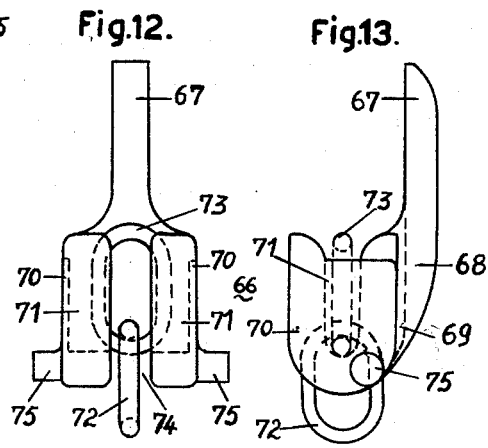
INVENTORS
ROGER GUILLAUME
EMILE GUILLAUME
BY Lurie and Finley
ATTORNEYS

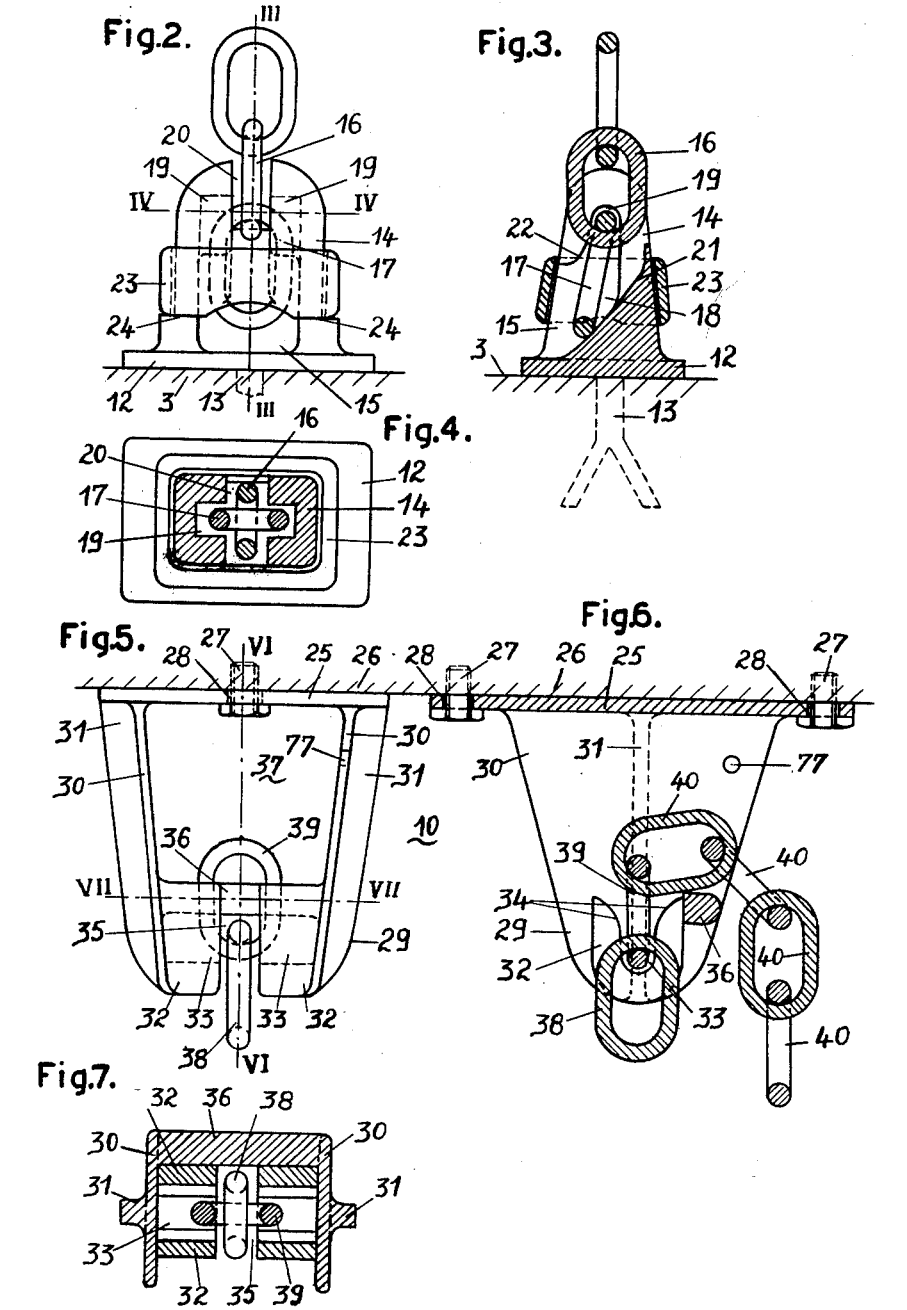

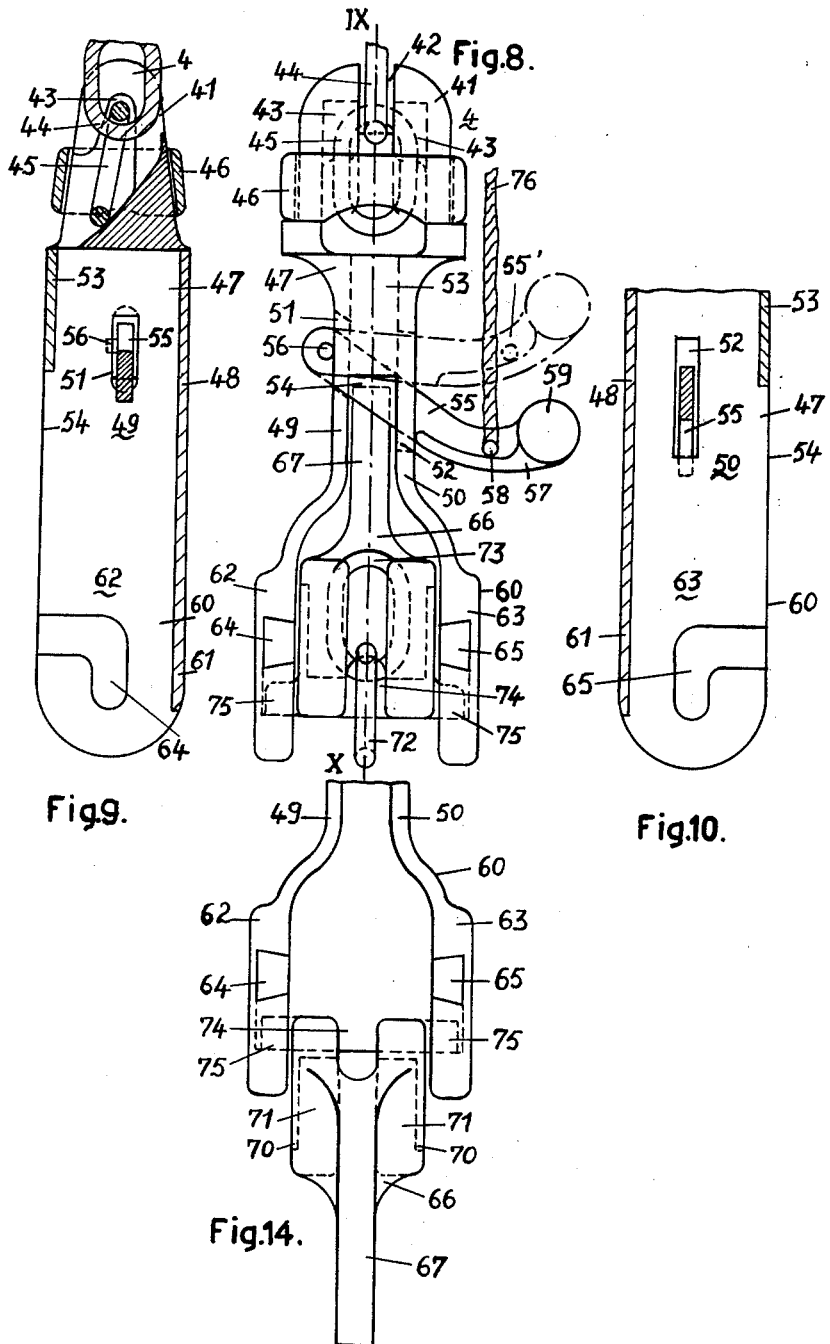

United States Patent Office 3,127,873
Patented Apr. 7, 1964

3,127,873
TETHERING DEVICES FOR STABLED ANIMALS
Roger Guillaume, 51 Ave. de la Salm, and Emile Guillaume, 49 Ave. de la Salm, both of Vielsalm, Belgium
Filed Mar. 14, 1962, Ser. No. 179,679
Claims priority, application Belgium Mar. 23, 1961
5 Claims. (Cl. 119—147)

The problem of tethering beasts has been the subject of considerable research, and a number of more or less satisfactory solutions has been put forward. Their object is to keep the animal in its place, by means of a collar which should allow the beast limited movement horizontally, and allow it the possibility of standing up, or lying down.

Among the devices in use, several comprise a vertical securing chain with its ends fixed respectively to the floor, and to the ceiling or an overhead beam intended for that purpose. The neck of the animal is then held between a part of the vertical securing chain, and neck-piece comprises a chain, belt or metal part-hoop which forms a collar or halter and has at both ends a ring surrounding the vertical chain so that it can slide along the latter. For the purposes of releasing the said neck-piece, it is possible either to use the so-called "open ring" arrangement, one of the neck-piece rings being designed to allow withdrawal of the vertical chain, thus opening the collar, or alternatively, to provide at a suitable height, within reach of the hand, a latching and unlatching means which may be referred to as a releasable shackle which permits the lower section of the vertical chain to be detached. In one advanced known arrangement this shackle is designed to permit immediate and simultaneous release of several animals, in cases of emergency, such as a fire.

Nevertheless the arrangements known at present have, in general, varying disadvantages. For example, some require the use of special chains with end rings differing from the other links, and the fixing of these rings to the anchor-components often involves the use of either bolts or pins or hooks which could injure the animal or of riveted components which are inconvenient to replace. When the animal moves and stresses the vertical securing chain, the operation of the shackle is frequently difficult, both when latching and unlatching, and calls for undue physical effort on the part of the operative. Also, in cases of wear of a ring, or of the lower links of the vertical chain, and this always occurs fairly rapidly since such components are exposed to the corrosive action of natural liquids present on the stable floor, then the complete replacement of the length of chain is often necessary.

When the shackle is designed so as to allow rapid release of several animals, this operation is usually carried out by means of a horizontal cable so that the shackles have to be fixed to individual pillars or to a transverse beam, thereby considerably increasing the basic cost of installation. Finally when not in use, the neck-pieces fall to the ground, thus being exposed to fouling or corrosion, and are not immediately to hand when the animals are to be tethered.

The arrangement provided by the present invention offers a very satisfactory solution, and enables the various disadvantages outlined above to be reduced or obviated.

In the make-up of the vertical chain the arrangement of the present invention provides for the use of two lengths of ordinary commercial chain the one being anchored to the ceiling and the other to the floor, and the free ends are connected together by a releasable shackle having an unlocking lever which operates vertically and frees an attachment component which tilts or turns angularly to allow unhooking or release of the lower length of vertical chain, thus freeing the animal. The same hooking-up principle is used, with slight differences in design, to allow the hooking-on of the ends of both the lengths of vertical chain. The ceiling chain length has a hooking device at its upper end designed in such a way that the chain can be connected or hooked on to its anchorage at any point along its length, thus giving the possibility of an adjustable reserve length which is useful should it be necessary to adjust the securing chain angle in relation to the vertical according to the size of the animals, and in the event of premature wear of the end links of the lower chain. The anchoring components have no dangerous projections, and hooking-up of the neck-piece in the lying down position is also allowed for. There is no need to calculate beforehand the length of the chain sections in relation to the stable height, it being simply sufficient, when starting from a long length of chain, to cut off or select lengths in situ, which is extremely simple and avoids any wastage of chain from the main length. The design of the releasable shackle components and their relative operation are such that stresses in the securing chain at various points due to movement of the animal does not affect operation of the device which can readily be carried out regardless of the efforts exerted by the animal. This is particularly important in cases where animals panic on outbreak of a fire. Furthermore, the dimensions of the lower section of the releasable shackle can be such that the upper ring on the neck-piece cannot slide over the shackle and rise so as to release the locking-lever unintentionally, as a result of movement on the part of the animal.

In order to explain more clearly the features of the invention, there is shown in the accompanying drawings by way of example, one convenient arrangement of tethering device in accordance with the present invention.

In said drawings,
FIGURE 1 shows an overall view of the arrangement as seen from the front;
FIGURE 2 is a front view of the ground fixing-component with retainer-ring;
FIGURE 3 is a vertical section along line III—III of FIGURE 2;
FIGURE 4 is a horizontal section along line IV—IV of FIGURE 2;
FIGURE 5 is a front view of the ceiling fixing-component;
FIGURE 6 is a vertical section along line VI—VI of FIGURE 5;
FIGURE 7 is a horizontal section along line VII—VII of FIGURE 5;
FIGURE 8 is a front-view of the releasable shackle with its locking-lever in the "locked" position shown in full lines;
FIGURE 9 is a vertical section of FIGURE 8 along line IX—X looking from the left, the locking lever being in its release position;
FIGURE 10 is a vertical section of FIGURE 8, along line IX—X, looking from the right, the locking lever again bearing in its release position;
FIGURE 11 is plan view of the locking-lever;
FIGURE 12 is a front view of a hooking-catch portion of the releasable shackle;
FIGURE 13 is a side view of the hooking-catch portion;
FIGURE 14 is a front view of the lower part of the shackle, after tilting the hooking catch portion; and
FIGURE 15 shows the side-view of a modified method of affixing to the ceiling.

Referring to FIGURE 1, the reference numeral indicates the lower length of vertical securing chain which is hooked at its lower end to a fixing-component 2 anchored to the ground 3 and at its upper end, it is connected to the releasable shackle 4. Slidably mounted along the chain length 1, by means of end rings (6 and 7) is the neck-piece 5. The neck of the animal 9 is held between the securing chain 1 and neck-piece 5 as indicated. The upper length of vertical chain 8 carries at its lower end the releasable shackle 4, and it is hooked at its upper end onto a fixing-component 10 fixed to the ceiling 11. Reference 5' indicates in dotted lines, the neck-piece 5 in an out-of-use position.

The fixing-components 2 (see FIGURES 2, 3, and 4) comprises a base-plate 12 which can be anchored to the ground by means of one or two fixing lugs 13, preferably welded to the base-plate 12, and the actual hooking-component 14. The latter has an opening 15 for the introduction of the lower end-links 16 and 17 of chain-length 1 and also, it has a recess 18 ending towards the top in two lateral grooves 19 adapted to receive the end-link 17. Extending in a plane perpendicular to these grooves 19 is a centre-slot 20 for receiving the second-link 16. The back 21 of the recess 18, opposite the opening 15, is shaped in the form of a ramp which will guide the links as they are introduced or withdrawn. Similarly, bevelled lips 22 are provided at the front of the grooves 19. A movable ring 23 having a section and periphery corresponding to the exterior of the hooking-components so as to fit closely thereover is provided to prevent premature or accidental release of links 16 and 17 by partly obstructing the opening 15. After having been previously threaded onto the chain-length 1 the said ring 23 is slipped over the hooking-component 14 after the said chain links 16 and 17 have been placed in position; the ring 23 then rests upon the two shoulder-pieces 24 of the said hooking-components 14. The lower edges of the ring 23 are slightly knurled or recessed to facilitate handling by the operative.

The upper fixing-component 10 (see FIGURES 5, 6 and 7) comprises a ring 25 which can be anchored to the ceiling 26 by any appropriate means, such as bolts 27 passing through holes in the base 28, and the actual hooking-component 29. The latter is made up of two spaced-apart opposed plates 30, 30, suitably reinforced by ribs 31. The inner faces of the plates 30 have two U-slotted pieces 32 opposite each other with grooves 33 to receive and hold a link 39 of the upper vertical chain-length 8. The top edges 34 of the grooves 33 are chamfered off in order to facilitate insertion of the link 39. The U-slotted pieces 32 are spaced from one another by a gap 35 to accommodate the link 38 which immediately precedes link 39. A distance-piece or web 36 joins the two plates 30 towards the rear and at approximately the same height as the top of the U-slotted-pieces 32. A space 37 is limited by the base-plate 25, side-pieces 30 and the top of the U-slotted pieces 32.

Referring more particularly to FIGURES 8, 9 and 10 the releasable shackle 4 is made up of the following parts, starting at the top: hooking-components 41 housing 47 with locking lever 55, base 60 and hooking-catch or rocking lever 66.

The hooking-components 41 are identical to the hooking component 14 of the fixing-component 2, and is made up of the same elements, namely, slot 42 and grooves 43 for receiving and holding the lower terminal links 44 and 45 on chain-length 8, together with a movable ring 46 to keep the links in position.

The housing 47 is in the form of a hollow parallel sided member which is closed at the top by the hooking-component 41 at the back by a wall section 48 and along the sides by the two walls 49 and 50, and at the front it is partially closed by a wall 53 which extends downwards only part-way of the height of the housing to provide the slot 54 which has a width equal to the distance between the inner faces of walls 49 and 50. The locking-lever 55 (see FIGURES 8 and 11) is curved as shown and has a bearing aperture drilled at the rear to receive a pivot pin 56 which is rivetted in position. The lever 55 passes through slots 51 and 52 which are provided opposite to each other but at different heights in the walls 49 and 50 and towards its outer end it has two longitudinal laterally-projecting ribs 57 which are located along its lower edge and rest against the wall 50. The outer end is drilled at 58 and terminates in an enlarged spherical head 59.

The lower part 60 of the housing 47 is closed at the back by the lower portion 61 of the wall 48 and at the sides by the lower portions 62 and 63 of the side walls 49 and 50. These portions 62 and 63 are spaced further apart than the upper portions and are provided with grooves 64 and 65, of L-form having a horizontal section opening towards the front and a vertical section leading downwards. The said lower part 60 is open at the front and at the bottom, and it receives the hooking-catch or rocking lever 66.

The hooking-catch or rocking lever 66 (see FIGURES 8, 12 and 13) has a tail-piece 67 which is offset towards the back of the housing 47, and a head portion comprising a bottom part 68 having a vertical centre groove 69 and two side walls 70 having grooves 71 adapted to receive the upper terminal link 73 of chain length 1. The walls 70 are spaced apart by a gap 74 extending into the groove 69 which has the same width and is intended to receive the second upper terminal link 72 of chain length 1. The walls 70 each have towards the bottom laterally-projecting flange-peg 75, the axis of which is offset towards the rear in relation to the centre axis of the vertical grooves 71. These pegs fit into the grooves 64 and 65 of the lower part 60 of the housing.

As shown in FIGURES 1 and 8 a rope 76 is attached to the locking lever 55 by being passed through the hole 58 and rises parallel to vertical chain-length 8, as far as the fixing component 10 where it is turned through 90° by threading through a perforation 77 in one of the side-piece 30, and it is then connected to a horizontal cable control, common to all tethering devices in a same stable row.

The installation and operation of the arrangement can then be described as follows:

Presuming that the fixing components 2 and 10 are anchored to floor and ceiling, and presuming that upper and lower chain-lengths 1 and 8 have been cut to length, the sequence of installation procedure may be as follows:

After threading ring 23 over chain-length 1, insert the two lower chain-links 16 and 17 into the opening 15 of the fixing-component 2 then introduce them or hook them into gap 20 and grooves 19 respectively, the ring 23 then being allowed to fall and rest on shoulder pieces 24. As already stated, the ring 23 will then prevent any unintentional release of links 16 and 17 since it partially obstructs the opening 15 and prevents turning of link 17. The neck-piece 15 is then attached to chain-length 1, in a manner already known, by threading through rings 6 and 7. At this stage, the two upper terminal chain links 72 and 73 on chain-length 1, are then respectively inserted and hooked into gap 74 and grooves 71 of the catch 66, the latter naturally being presumed in the raised and locked operative position shown in FIGURE 8. The connection of chain-length 8 and the shackle is carried out in the same manner as outlined for fixing-component 2 and chain-length 1. The end of chain-length 8 is introduced into space or gap 37 of fixing component 10 and depending on the required degree of tension on the vertical chain, the required consecutive links 38 and 39 are dropped into the gap 35 and the grooves 33 respectively with preferably a number of spare end-links 40 remaining available; these latter are supported by the distance-piece 36 over which they hang freely as shown in FIGURE 6. All that remains is to fix the rope 76 to the lever 55 and then connect it to the horizontal control cable 78. Obviously, however, the sequence of operations may be varied in practice from that outlined here.

In the event of chain terminal links having to be replaced on chain-length 1, all that is required is to readjust to suitable length, after feeding foward the required number of links from the reserve links 40 at the fixing component 10.

Where the animal to be tethered is smaller than usual so that it requires to be held in a different lateral position, the effective ceiling hooking point can be displaced for instance by passing chain-length 8 through a hook 79, placed to one side of the fixing component 10 as shown in FIGURE 15. This operation is made possible at all times by virtue of the spare links 40. The securing chain will then be slightly angled as shown, and will tend to bring the animal back into the correct position, in relation to the floor drainage channel.

In order to obtain immediate release of the animals, all that is required is to pull on cable 78 in the appropriate direction, the rope 76 then raising the head of the locking lever 55, which pivots at 56 and takes up position 55' as shown in dotted lines (FIGURE 8). As a result, the tail 67 of the catch 66 is freed, the latter is pulled and rotated forward, under the weight of chain-length 1, by pivoting around the pegs 75 which are off-centre towards the rear in relation to the centre-line plane of the vertical grooves 71. The catch 66 then turns angularly or tilts until it takes up position as shown in FIGURE 14, and during the course of this movement the terminal chain links 72 and 73 slip out of gap 74 grooves 71 so as to free the chain-length 1 which drops down and releases at least ring 6 on neck-chain 5, thus freeing the animal immediately.

The same result can clearly also be obtained by hand-actuation of lever 55 for the purposes of freeing one animal only. This method can be applied where the so-called "open ring" method is not applied for tethering, that is, where rings 6 and 7 are both closed as well as when rings 6 and 7 are open. It should be noted that the movement is carried out with one hand only, which is a further advantage of the system.

When the animal is not stabled, it is preferable, as stated, that the neck-piece 5 should not remain on the floor. With the arrangement hereinbefore described, it can be conveniently hung by its upper ring 6 from the lever 55 which has been designed for that purpose. This is shown in dotted lines in FIGURE 1, with neck-piece 5' in position.

Clearly many other design modifications can also be made within the scope of the present invention.

We claim:

1. A device for tethering animals in stables, comprising a pair of chain lengths for disposition in vertical alignment, upper and lower fixing components each having means for removably securing one end of each of said chain lengths, a releasable coupling device for securing the other ends of said chain lengths, an animal neck piece terminating in a pair of rings slideably disposed on said chain lengths, said coupling device having a rocking lever releasably maintained in a raised position by a locking lever, the coupling device having recesses in laterally opposed walls, the rocking lever being provided with pegs pivotally inserted in said recesses, and grooves in said rocking lever provided with a median transverse slot for receiving the end links of the lower length of chain, said grooves being offset relatively to the said pegs.

2. A device for tethering animals in stables according to claim 1 wherein said fixing components are each provided with grooves and a substantially perpendicular median slot located in the walls of said components for releasably receiving a pair of links near the ends of the chain lengths to be secured, the upper portion of the releasable coupling device also comprising a set of grooves and substantially perpendicular median slot for receiving the links of the lower end of the upper length of chain, each of said lower fixing component and said upper portion of the releasable coupling device being surrounded by a movable ring for releasably retaining the links to be secured.

3. A device for tethering animals according to claim 2 wherein each of said upper and lower fixing components and said upper portion of said coupling device present external rounded surfaces of tapering form, said movable rings being slideable on said chain lengths from release positions to retaining positions surrounding said fixing components and upper portion of the coupling device in which portions of said grooves and median slots are covered to secure links of the chain lengths therein.

4. A device for tethering animals according to claim 2 wherein said upper fixing component presents a passageway above said set of grooves and median slot for retention of spare links in the upper length of chain.

5. A device for tethering animals, comprising a vertical chain in two lengths, upper and lower fixing components releasably securing one end of each chain length, a neck piece terminating in a pair of rings slideable on said vertical chain and, a releasable coupling device, having a rocking lever maintained in a raised position by means of a locking lever, interposed between and releasably connecting the other ends of said two chain lengths, said locking lever having its free end proportioned to be received in the opening of one of the rings of the neck piece when said neck piece is not applied about the neck of an animal.

References Cited in the file of this patent

UNITED STATES PATENTS

| | | |
|---|---|---|
| 1,676,568 | McCandless | July 10, 1928 |
| 2,534,619 | Niemi | Dec. 19, 1950 |
| 2,651,089 | Call | Sept. 8, 1953 |

FOREIGN PATENTS

| | | |
|---|---|---|
| 268,298 | Germany | Dec. 12, 1913 |
| 1,087,400 | Germany | Aug. 18, 1960 |
| 298,536 | Great Britain | June 27, 1929 |